United States Patent
Yu et al.

(10) Patent No.: US 8,603,682 B2
(45) Date of Patent: Dec. 10, 2013

(54) SECONDARY BATTERY AND MANUFACTURING METHOD OF THE SAME

(75) Inventors: Sunghoon Yu, Daejeon (KR); Jeong-Ju Cho, Daejeon (KR); Soojin Kim, Daejeon (KR); Soo-Hyun Ha, Daejeon (KR)

(73) Assignee: LG Chem, Ltd. (KR)

( * ) Notice: Subject to any disclaimer, the term of this patent is extended or adjusted under 35 U.S.C. 154(b) by 599 days.

(21) Appl. No.: 12/597,938

(22) PCT Filed: May 14, 2008

(86) PCT No.: PCT/KR2008/002684
§ 371 (c)(1),
(2), (4) Date: Nov. 23, 2009

(87) PCT Pub. No.: WO2008/140256
PCT Pub. Date: Nov. 20, 2008

(65) Prior Publication Data
US 2010/0136435 A1 Jun. 3, 2010

(30) Foreign Application Priority Data
May 15, 2007 (KR) .................. 10-2007-0047031

(51) Int. Cl.
*H01M 6/14* (2006.01)
*H01M 10/04* (2006.01)

(52) U.S. Cl.
USPC ........... 429/303; 429/188; 429/189; 29/623.5

(58) Field of Classification Search
USPC ......... 429/303, 300, 317, 307, 217, 188, 189; 29/623.5
See application file for complete search history.

(56) References Cited

U.S. PATENT DOCUMENTS

| | | |
|---|---|---|
| 5,463,179 A | 10/1995 | Chaloner-Gill et al. |
| 2001/0006750 A1* | 7/2001 | Yoshida et al. ............... 429/300 |

(Continued)

FOREIGN PATENT DOCUMENTS

| | | |
|---|---|---|
| JP | 2005038744 A | 2/2005 |
| KR | 19980084657 A | 12/1998 |
| KR | 20040020633 A | 3/2004 |
| WO | 2005/023921 A1 | 3/2005 |

OTHER PUBLICATIONS

Machine Translation of: KR 20040020633, Lee, Gyeong-Hui, Mar. 9, 2004.*
Supplementary European Search Report, EP 08753480, dated Sep. 30, 2010.
International Search Report, PCT/KR2008/002684, dated Jul. 23, 2008.

*Primary Examiner* — Kenneth Douyette
(74) *Attorney, Agent, or Firm* — Lerner, David, Littenberg, Krumholz & Mentlik, LLP

(57) ABSTRACT

Disclosed is a secondary battery including (i) a cathode; (ii) an anode; (iii) a separator; and (iv) a gel polymer electrolyte composition including an electrolyte solvent, an electrolyte salt, and a polymerizable monomer, wherein a polymerization initiator is coated or added on at least one battery device element in contact with the gel polymer electrolyte composition. Also, the secondary battery including a cathode, an anode, a separator, and a gel polymer electrolyte is manufactured by the steps of: coating or adding a polymerization initiator on/to at least one battery device element in contact with the gel polymer electrolyte; inserting the cathode, the anode, and the separator into a battery case; and forming the gel polymer electrolyte by injecting a gel polymer electrolyte composition including an electrolyte solvent, an electrolyte salt, and a polymerizable monomer into the battery case, and carrying out polymerization.

16 Claims, 1 Drawing Sheet

(56) References Cited

U.S. PATENT DOCUMENTS

| | | |
|---|---|---|
| 2003/0027045 A1* | 2/2003 | Morigaki et al. ............ 429/217 |
| 2003/0157411 A1* | 8/2003 | Jung et al. .................. 429/317 |
| 2004/0038130 A1* | 2/2004 | Imachi et al. ................ 429/250 |
| 2004/0101752 A1* | 5/2004 | Oosawa et al. ............... 429/217 |
| 2004/0126665 A1* | 7/2004 | Sun ............................. 429/303 |
| 2005/0084764 A1* | 4/2005 | Lee et al. ..................... 429/317 |
| 2005/0227150 A1 | 10/2005 | Xing et al. |
| 2008/0216942 A1 | 9/2008 | Hiraoka et al. |

* cited by examiner

# SECONDARY BATTERY AND MANUFACTURING METHOD OF THE SAME

CROSS REFERENCE TO RELATED APPLICATIONS

The present application is a national phase entry under 35 U.S.C. §371 of International Application No. PCT/KR08/02684, filed May 14, 2008, published in English, which claims priority from Korean Patent Application No. 10-2007-0047031, filed May 15, 2007, all of which are incorporated herein by reference.

TECHNICAL FIELD

The present invention relates to a secondary battery including a gel polymer electrolyte composition subjected to gelation, and a method for manufacturing a secondary battery including a gel polymer electrolyte in which the composition is gelated.

BACKGROUND ART

Recently, there has been increasing interest in energy storage technology. Electrochemical devices have been widely used as energy sources in portable phones, camcorders, notebook computers, PCs and electric cars, resulting in intensive research and development. In this regard, electrochemical devices are subjects of great interest. Particularly, development of rechargeable secondary batteries has been the focus of attention.

Conventionally, as an electrolyte for an electrochemical device such as a battery using an electrochemical reaction, an electric dual layer capacitor, etc., an electrolyte in a liquid phase, especially an ion conductive organic liquid electrolyte in which salt is dissolved in a non-aqueous organic solvent has been mainly used.

However, when such an electrolyte in a liquid phase is used, there is a high possibility that an electrode material is deteriorated, and an organic solvent is volatilized. In addition, there may occur a safety problem, such as combustion by an increase of ambient temperature or a battery's own temperature. Particularly, in the case of a lithium secondary battery, there is a problem in that during charge/discharge, gas is generated within the battery by decomposition of a carbonate organic solvent, and/or a side reaction of the organic solvent and an electrode, thereby expanding a battery thickness. Also, through high storage, such a reaction is accelerated, thereby more significantly increasing the amount of the generated gas.

The continuously generated gas increases internal pressure of the battery, and thus causes deformation of the center on a certain portion of the battery, such as expansion of a prismatic battery in a certain direction. In addition, the gas makes a minute difference in adhesion on an electrode surface within the battery, and thus an electrode reaction cannot be uniformly carried out over the whole electrode surface, thereby causing the thickness to be non-uniformly formed. Accordingly, performance and safety of the battery are inevitably reduced.

In general, it is known that in the order of a liquid electrolyte <a gel-type polymer electrolyte <a solid polymer electrolyte, the safety of a battery is improved, but the battery performance is reduced. Due to such a low battery performance, batteries employing a solid polymer electrolyte have not yet been commercialized.

Meanwhile, a conventionally known manufacturing method of a battery using a gel-type polymer electrolyte includes the following two methods.

In one method, a battery including a gel-type polymer electrolyte is manufactured by the steps of: injecting a composition where a polymerizable monomer and a polymerization initiator are mixed with a liquid electrolyte including a non-aqueous organic solvent containing salt dissolved therein, into the battery including an electrode assembly in which a cathode, an anode, and a separator are wound or laminated; and subjecting the composition to gelation under appropriate temperature and time conditions.

However, in this method, a process for maintaining temperature for the gelation is required, thereby causing a loss in time and economic efficiency. Also, in a certain constituent ratio of the polymerizable monomer or the polymerization initiator, the gelation may be carried out at room temperature without a heating process, but there is a possibility that the gelation is carried out before composition injection into the battery.

In another method, a battery is manufactured by the steps of: coating a composition where a polymerizable monomer and a polymerization initiator are mixed with a liquid electrolyte including a non-aqueous organic solvent containing salt dissolved therein, on a separator; subjecting the composition to gelation by using heat or UV rays; assembling the separator with a cathode and an anode to manufacture the battery; and injecting a conventional liquid electrolyte to the battery.

However, in this method, a process of irradiating heat or UV for gelation is required. Also, the separator coated with gel may absorb moisture, thereby reducing performance and safety of the battery.

DISCLOSURE

Technical Problem

Therefore, the present invention has been made in view of the above-mentioned problems. The present invention provides a secondary battery, and a manufacturing method of the same, wherein the secondary battery has time/economic efficiency in a manufacturing process, high productivity, and improved performance due to sufficient gelation of a gel polymer electrolyte composition.

Technical Solution

In accordance with an aspect of the present invention, there is provided a secondary battery including (i) a cathode; (ii) an anode; (iii) a separator; and (iv) a gel polymer electrolyte composition including an electrolyte solvent, an electrolyte salt, and a polymerizable monomer, wherein a polymerization initiator is coated or added on at least one battery device element in contact with the gel polymer electrolyte composition.

The gel polymer electrolyte composition may be gelated through polymerization by the polymerization initiator.

In accordance with another aspect of the present invention, there is provided a method for manufacturing a secondary battery including a cathode, an anode, a separator, and a gel polymer electrolyte, the method including the steps of: coating or adding a polymerization initiator on/to at least one battery device element in contact with the gel polymer electrolyte; inserting the cathode, the anode, and the separator into a battery case; and forming the gel polymer electrolyte by injecting a gel polymer electrolyte composition including an electrolyte solvent, an electrolyte salt, and a polymerizable monomer into the battery case, and carrying out polymerization.

BEST MODE

Figure 1:
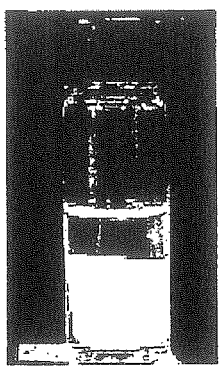
FIG. 1 is a photograph showing a gelation state of a gel polymer electrolyte composition obtained from Example 2, at the time point when a separator obtained from Example 1 is introduced.

As mentioned above, in a conventional method for manufacturing a secondary battery including a gel polymer electrolyte, a composition where a polymerizable monomer and a polymerization initiator are mixed with a liquid electrolyte including a non-aqueous electrolyte solvent containing an electrolyte salt dissolved therein has been usually used. However, if components of the composition are within a certain constituent ratio, the composition may be subjected to gelation through a polymerization reaction at room temperature, and thus, it may be difficult to inject the prepared composition into the battery.

However, in the present invention, instead of the composition where a polymerizable monomer and a polymerization initiator are mixed with a liquid electrolyte including an electrolyte salt dissolved in an electrolyte solvent, another gel polymer electrolyte composition, which does not include the polymerization initiator, is used. Herein, the polymerization initiator excluded from the gel polymer electrolyte composition is used in an additional way.

Specifically, in the present invention, the polymerization initiator is coated on or added to at least one battery device element in contact with the gel polymer electrolyte. The battery device element in contact with the gel polymer electrolyte may be selected from the group including a cathode, an anode, a separator, and a battery case.

In the present invention, after a cathode, an anode, and a separator are inserted in a battery case, the gel polymer electrolyte composition including an electrolyte solvent, an electrolyte salt, and a polymerizable monomer is injected into the battery case. Accordingly, the gel polymer electrolyte composition may be subjected to gelation through polymerization by the polymerization initiator coated on/added to the battery device element, and thus is formed into a gel polymer electrolyte.

In general, gelation largely depends on the amount of polymerization initiator, rather than the amount of polymerizable monomer. In other words, for the gelation, it is effective to doubly increase the amount of the polymerization initiator, rather than the amount of the polymerizable monomer. However, when the polymerization initiator is dissolved in an electrolyte solvent, the activity of the polymerization initiator is reduced over time. In the present invention, since the polymerization initiator is coated on or added to a battery device element to be contact with a gel polymer electrolyte, it is possible to sufficiently keep polymerization initiator.

Meanwhile, when a polymerizable monomer is previously included in a battery device element, such as a cathode, an anode, or a separator, a gel may be densely formed in the portion where the polymerizable monomer has been included, thereby interrupting the movement of lithium ions. In the case of a polymerizable monomer coated on a separator, for gelation, the coated polymerizable monomer is required to be uniformly dispersed within a battery through dissolution by a subsequently injected gel polymer electrolyte composition, or else, in the vicinity of the separator, a dense gel may be formed. However, in the present invention, since a polymerization initiator is previously included in a battery device element, such as a cathode, an anode, or a separator, the concentration of polymerizable monomer may be uniformly maintained in any portion within a battery, and thus such a problem may not occur.

Also, according to the present invention, a polymerization initiator and a polymerizable monomer are mixed with each other after a gel polymer electrolyte composition is injected into a battery case. Accordingly, the present invention may employ a polymerization initiator and a polymerizable monomer in any mixing ratio, even in a ratio where two materials are difficult to inject to a battery due to gelation via a polymerization reaction at room temperature.

Also, in the present invention, when gelation is carried out at room temperature via a polymerization reaction after the injection of a gel polymer electrolyte composition, a curing process is not required for gelation, and thus it is advantageous from the economic/time standpoint. Also, performance differences among products, which may be caused by temperature differences among batteries through the curing process, may be reduced.

Meanwhile, unlike a conventional technology in which a liquid electrolyte is mixed with a polymerization initiator and a polymerizable monomer before injection, in the present invention, since a polymerization initiator and a polymerizable monomer are mixed with each other after injection, the concentration gradient between the two materials, which is caused by mixing the polymerization initiator and the polymerizable monomer with each other, is increased. Thus, gelation may be actively carried out, thereby improving the performance of a battery.

As a specific example, in a conventional technology, when a composition including 5 wt % of polymerizable monomer and 0.03 wt % of polymerization initiator is injected into a battery case, the concentration of the polymerizable monomer and the polymerization initiator is maintained as it is in any portion within a battery. However, according to an embodiment of the present invention, in the case where a polymerization initiator is coated on a separator, upon injection of a gel polymer electrolyte composition, which does not include the polymerization initiator, but includes a polymerizable monomer, into a battery, the concentration of the polymerization initiator reacted to the polymerizable monomer in the vicinity of the separator may more significantly increase, even if the polymerizable monomer and the polymerization initiator are injected in the same concentrations (5 wt % and 0.03 wt %, respectively) to the conventional example. Accordingly, the initiation for gelation may be more actively carried out, resulting in improvement of performance of the battery.

In the present invention, a polymerizable monomer is not particularly limited as long as it is subjected to a polymerization reaction, but preferably may be a compound having a polymerizable functional group selected from the group including a vinyl group, an epoxy group, an allyl group, and a (meth)acryl group. Also, when two polymerizable functional groups are included in the polymerizable monomer, the two polymerizable functional groups may be the same or different.

Non-limiting examples of the polymerizable monomer include, but are not limited to, tetraethylene glycol diacrylate, poly ethylene glycol diacrylate, molecular weight of 50~20,000), 1,4-1,4-butanediol diacrylate, 1,6-hexandiol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, poly(ethylene glycol) diglycidyl ether, 1,5-hexadiene diepoxide, glycerol propoxylate triglycidyl ether, vinylcyclohexene dioxide, 1,2,7,8-diepoxyoctane, 4-vinylcyclohexene dioxide, butyl glycidyl ether, diglycidyl 1,2-cyclohexanedicarboxylate, ethylene glycol diglycidyl ether, glycerol triglycidyl ether, glycidyl methacrylate, etc. Such compounds may be used alone or in combination.

Also, the polymerizable monomer may be used in an amount of 0.01 to 10 parts by weight, based on 100 parts by weight of the mixture of the electrolyte solvent and the electrolyte salt. If the content of the polymerizable monomer is more than 10 parts by weight, during the injection of a gel polymer electrolyte composition into a battery, gelation is too rapidly carried out or a very dense gel is formed, thereby increasing resistance of a gel. On the other hand, if the content of the polymerizable monomer is less than 0.01 parts by weight, gelation is not sufficiently carried out.

In the present invention, as a polymerization initiator, a conventional polymerization initiator known in the art may be used.

Non-limiting examples of the polymerization initiator include, but are not limited to, organic peroxides, such as benzoyl peroxide, acetyl peroxide, dilauryl peroxide, di-tert-butyl peroxide, t-Butyl peroxy-2-ethylhexanoate, cumyl hydroperoxide, hydrogen peroxide, etc., hydroperoxides, azo compounds, such as 2,2'-azobis(2-cyanobutane), 2,2'-azobis (methylbutyronitrile), AIBN(2,2'-azobis(iso-butyronitrile), AMVN (2,2'-azobisdimethyl-valeronitrile), etc.

The polymerization initiator may generate a radical through decomposition by heat (a non-limiting example, heat within a range of 30 to 100° C.) or at room temperature (5 to 30° C.) within a battery, and may form a gel polymer electrolyte by a reaction with a polymerizable monomer through free radical polymerization.

Also, the polymerization initiator may be used in an amount of 0.01 to 5 parts by weight, based on the based on 100 parts by weight of the mixture of the electrolyte solvent and the electrolyte salt. If the content of the polymerization initiator is more than 5 parts by weight, during the injection of a gel polymer electrolyte composition into a battery, gelation is too rapidly carried out or an unreacted amount of the initiator remains, thereby adversely affecting the performance of the battery. On the other hand, if the content of the polymerization initiator is less than 0.01 parts by weight, gelation is not sufficiently carried out.

In the present invention, the electrolyte solvent, which is used to dissolve or dissociate the electrolyte salt, is not particularly limited as long as it is conventionally used for an electrolyte solvent for a battery, and examples of the electrolyte solvent may include cyclic carbonates, linear carbonates, lactones, ethers, esters, sulfoxides, acetonitriles, lactams, ketones, a halogen derivative thereof, etc.

Particular examples of the cyclic carbonates include ethylene carbonate (EC), propylene carbonate (PC), butylene carbonate (BC), fluoroethylene carbonate (FEC) or the like. Particular examples of the linear carbonates include diethyl carbonate (DEC), dimethyl carbonate (DMC), dipropyl carbonate (DPC), ethylmethyl carbonate (EMC), methyl propyl carbonate (MPC), or the like. Particular examples of the lactone include gamma-butyrolactone (GBL). Particular examples of the ether include dibutyl ether, tetrahydrofuran, 2-methyltetrahydrofuran, 1,4-dioxane, 1,2-dimethoxyethane, 1,2-diethoxyethane, or the like. Particular examples of the ester include methyl formate, ethyl formate, propyl formate, methyl acetate, ethyl acetate, propyl acetate, methyl propionate, ethyl propionate, butyl propionate, methyl pivalate, or the like. Also, examples of the sulfoxide include dimethylsulfoxide, etc.; examples of the lactam include N-methyl-2-pyrrolidone (NMP); and examples of the ketone include polymethylvinyl ketone. Also, halogen derivatives thereof may be used, and are not limited to the above exemplified electrolyte solvents. Such electrolyte solvents may be used alone or in combination.

Any electrolyte salt currently used for a battery may be used in the present invention with no particular limitation.

For example, the electrolyte may include a combination of (i) a cation selected from the group including $Li^+$, $Na^+$, and $K^+$ and (ii) an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$, but the present invention is not limited thereto. Such electrolyte salts may be used alone or in combination. Particularly, a lithium salt is preferred.

In addition to the above mentioned components, the gel polymer electrolyte composition according to the present invention may optionally include an additive, etc. known in the art.

In the present invention, as described above, gelation through a polymerization reaction may be carried by thermal polymerization or at room temperature (5 to 30° C.). Herein, the time for polymerization may be within a range of about 10 minutes to 12 hours, and the temperature for the thermal polymerization may be within a range of 30 to 100° C.

In the present invention, the gelation through the polymerization reaction is preferably carried out under an inert condition. When the polymerization reaction is carried out in an inert atmosphere, the reaction of oxygen (which is, a radical destroyer) in the air, with a radical is thoroughly suppressed, thereby increasing the extent of reaction so that almost no unreacted polymerizable monomer exists. Accordingly, it is possible to prevent the degradation of a charge/discharge performance, which is caused by a large amount of unreacted monomer remaining within a battery.

For the inert atmospheric conditions, conventionally known gas having low reactivity may be used, and particularly, at least one inert gas selected from the group including nitrogen, argon, helium, and xenon may be used.

Through the gelation by such a polymerization reaction, a gel polymer electrolyte is formed. Specifically, a gel polymer in which polymerizable monomers are cross-linked with each other by the polymerization reaction is formed, and a liquid electrolyte in which an electrolyte salt is dissociated in an electrolyte solvent may be uniformly impregnated within the formed gel polymer.

In the present invention, a secondary battery is preferably a lithium secondary battery, and non-limiting examples of the lithium secondary battery include a lithium metal secondary battery, a lithium ion secondary battery, a lithium polymer secondary battery, or a lithium ion polymer secondary battery.

Also, in the present invention, a cathode and an anode may be manufactured by a conventional method known in the art. For example, the electrode active material may be mixed with a solvent, and optionally with a binder, a conductive agent, and a dispersant, and the mixture is agitated to provide slurry. Then, the slurry is applied (coated) onto a metal collector, and the collector coated with the slurry is compressed and dried to provide an electrode. The electrode active material may include a cathode active material or an anode active material.

Non-limiting examples of the cathode active material may include, but are not limited to, a lithium transition metal composite oxide such as $LiM_xO_y$(M=Co, Ni, Mn, $Co_aNi_b$-$Mn_c$) (for example, lithium manganese composite oxide such as $LiMn_2O_4$, lithium nickel oxide such as $LiNiO_2$, lithium cobalt oxide such as $LiCoO_2$, oxides in which the manganese, nickel, and cobalt are substituted by transition metal, lithium containing vanadium oxide, etc), chalcogenide (for example, manganese dioxide, titanium disulfide, molybdenum disulfide, etc.), etc.

As an anode active material that may be used in the present invention, a conventional anode active material used for an anode of a conventional secondary battery may be used. Non-limiting examples of the anode active material may include lithium metal, lithium alloy, carbon, petroleum coke, activated carbon, graphite, carbon fiber, etc, which can intercalate and deintercalate lithium ions. In addition, a metal oxide which can intercalate and deintercalate lithium ions and has a potential of less than 2V for lithium, such as $TiO_2$, $SnO_2$, etc., may be used. However, the present invention is not limited thereto. Particularly, a carbonaceous material, such as graphite, carbon fiber, activated carbon, etc.

The metal collector includes a metal with high conductivity. Any metal to which the electrode active material slurry can be adhered with ease can be used as long as it shows no reactivity in the drive voltage range of a battery using the same. Non-limiting examples of a cathode current collector may include a foil made of aluminum, nickel or a combination thereof; and non-limiting examples of an anode current collector may include a foil made of copper, gold, nickel, copper alloy or a combination thereof.

A separator which can be used in the present invention is not limited to any specific separator, but a porous separator may be preferably used, and non-limiting examples thereof include polypropylene-based, polyethylene-based, and polyolefin-based porous separators. Also, it is possible to apply the separator to a battery through lamination, stack, folding, etc. as well as winding.

There is no particular limitation in the outer shape of the secondary battery according to the present invention. The secondary battery may be a cylindrical battery using a can, a prismatic battery, a pouch-type battery, or a coin-type battery, etc.

Reference will now be made in detail to the preferred embodiments of the present invention. However, the following examples are illustrative only, and the scope of the present invention is not limited thereto.

EXAMPLE 1

Preparation of a Separator Coated with a Polymerization Initiator 0.00825 g of t-butyl peroxy-2-ethylhexanoate was dissolved in acetone as a polymerization initiator, and then, the solution was uniformly coated on a polyolefin separator and was subjected to drying, to obtain a separator coated with the polymerization initiator.

EXAMPLE 2

Preparation of a Gel Polymer Electrolyte Composition

A gel polymer electrolyte composition was prepared by adding 5 parts by weight of trimethylolpropane triacrylate as a polymerizable monomer, to 100 parts by weight of an electrolyte solution, that is, a non-aqueous electrolyte solvent including ethylene carbonate (EC) and ethyl methyl carbonate (EMC) in a ratio of 1:2 (v:v) and containing 1M $LiPF_6$ dissolved therein.

EXPERIMENTAL EXAMPLE 1

Test on Gelation

A gelation test was carried out by using the separator obtained from Example 1 and the gel polymer electrolyte composition obtained from Example 2. Specifically, the separator was introduced into the gel polymer electrolyte composition, and the extent of gelation over time was calculated by Formula 1. Table 1 shows the results.

The extent of gelation over time (%)=(height of gelated portion/the entire height of solution)×100     [Formula 1]

TABLE 1

| Time | 20 minutes | 40 minutes | 60 minutes | 90 minutes |
| --- | --- | --- | --- | --- |
| gelation | 10% | 85% | 100% | 100% |

As noted in Table 1, it is determined that the gelation was completely carried in 1 hour from the time point when the gelation started.

Figure 2:
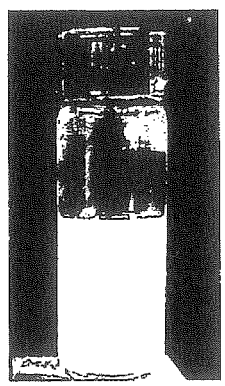
FIG. 2 is a photograph showing a gelation state of a gel polymer electrolyte composition obtained from Example 2, after 1 hour from the time point when the separator obtained from Example 1 is introduced.

Also, FIG. 1 is a photograph showing a gelation state of the gel polymer electrolyte composition obtained from Example 2, at the time point when the polymerization initiator-coated separator obtained from Example 1 was introduced; and FIG. 2 is a photograph showing a gelation state after 1 hour from the introduction. In FIG. 1, the solution is not turbid because the state is before the gelation is carried out, but in FIG. 2, the solution is very turbid because the gelation is carried out to some extent.

EXAMPLE 3

Preparation of a Separator Coated with a Polymerization Initiator 0.01 g of t-butyl peroxy-2-ethylhexanoate was dissolved in 3 g of diethyl ether, as a polymerization initiator, and then, the solution was uniformly impregnated in a polyolefin separator of 20 cm×6 cm and was subjected to drying, to obtain a separator coated with the polymerization initiator.

EXAMPLE 4

Preparation of a Separator Coated with a Polymerization Initiator

A separator was obtained in the same manner as described in Example 3, except that 0.05 g of t-butyl peroxy-2-ethylhexanoate was used.

EXAMPLE 5

Preparation of a Separator Coated with a Polymerization Initiator

A separator was obtained in the same manner as described in Example 3, except that 0.1 g of t-butyl peroxy-2-ethylhexanoate was used.

EXAMPLE 6

Preparation of a Separator Coated with a Polymerization Initiator

A separator was obtained in the same manner as described in Example 3, except that 0.5 g of t-butyl peroxy-2-ethylhexanoate was used.

EXPERIMENTAL EXAMPLE 2

Test on Gelation

A gelation test was carried out by using the each of the separators obtained from Examples 3 to 6 and the gel polymer electrolyte composition obtained from Example 2. Specifically, a circularly cut separator having a radius of 0.8 cm was introduced into 2 g of the gel polymer electrolyte composition, and was left at 80° C. for 3 hours. Then, the extent of gelation over time was observed as shown in FIG. 3.

Figure 3:
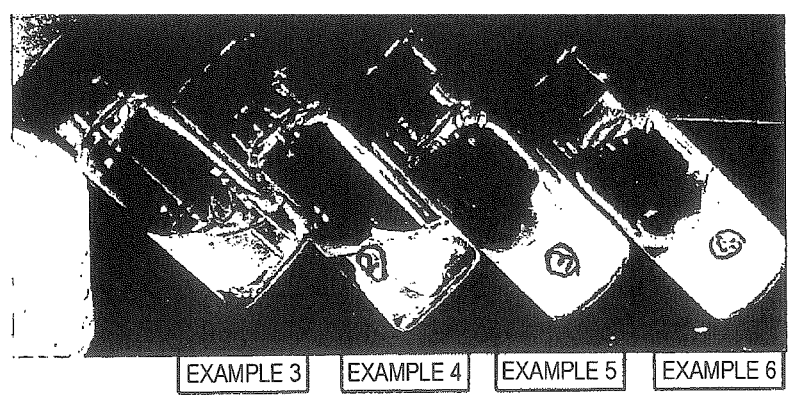
FIG. 3 is a photograph showing a gelation state of a gel polymer electrolyte composition obtained from Example 2, after each of the separators obtained from Examples 3 to 6 is introduced and the mixture is left at 80° C. for 3 hours.

As shown in FIG. 3, when the separators obtained from Examples 3 and 4 were used, the solutions were not turbid because gelation was not carried out due to small amounts of the initiators. On the other hand, when the separators obtained from Examples 5 and 6 were used, the solutions were very turbid because gelation was sufficiently carried out due to large amounts of the initiators.

According to the above gelation tests of Experimental Examples 1 and 2, it is determined that when a separator coated with a polymerization initiator and a gel polymer electrolyte composition are used, it is possible to prepare a gel polymer electrolyte through gelation.

EXAMPLE 7

Fabrication of a Coin-Type Secondary Battery

To N-methyl-2-pyrrolidone (NMP) as a solvent, 94 wt % of $LiCoO_2$ as a cathode active material, 3 wt % of carbon black as a conductive agent and 3 wt % of PVDF as a binder were added to form slurry for a cathode. The slurry was coated on Al foil having a thickness of about 20 μm as a cathode collector, and then dried to form a cathode via roll press.

To N-methyl-2-pyrrolidone (NMP) as a solvent, 96 wt % of carbon powder as an anode active material, 3 wt % of PVdF (polyvinylidene fluoride) as a binder and 1 wt % of carbon black as a conductive agent were added to form mixed slurry for an anode. The slurry was coated on Cu foil having a thickness of about 10 μm as an anode collector, and then dried to form an anode via roll press.

In fabrication of the battery, the cathode and anode, and the separator obtained from Example 3 were used. Also, an electrolyte was prepared by adding 5 parts by weight of di(trimethylopropene) tetraacrylate as a polymerizable monomer, to 100 parts by weight of an electrolyte solution, that is, a non-aqueous electrolyte solvent including ethylene carbonate (EC) and ethyl methyl carbonate (EMC) in a ratio of 1:2 (v:v) and containing 1M $LiPF_6$ dissolved therein. After 3 hours from the injection, polymerization was carried out at 80° C. for 4 hours under nitrogen atmosphere to obtain a coin-type secondary battery.

EXAMPLE 8

Fabrication of a Coin-Type Secondary Battery

A coin-type secondary battery was obtained in the same manner as described in Example 7, except that the separator obtained from Example 4 was used instead of the separator obtained from Example 3.

EXAMPLE 9

Fabrication of a Coin-Type Secondary Battery

A coin-type secondary battery was obtained in the same manner as described in Example 7, except that the separator obtained from Example 5 was used instead of the separator obtained from Example 3.

EXAMPLE 10

Fabrication of a Coin-Type Secondary Battery

A coin-type secondary battery was obtained in the same manner as described in Example 7, except that the separator obtained from Example 6 was used instead of the separator obtained from Example 3.

COMPARATIVE EXAMPLE 1

Fabrication of a Coin-Type Secondary Battery

A coin-type secondary battery was obtained in the same manner as described in Example 7, except that a conventional polyolefin separator was used, and only a non-aqueous electrolyte solvent including ethylene carbonate (EC) and ethyl methyl carbonate (EMC) in a ratio of 1:2 (v:v) and containing 1M $LiPF_6$ dissolved therein was used as an electrolyte.

COMPARATIVE EXAMPLE 2

Fabrication of a Coin-Type Secondary Battery

A coin-type secondary battery was obtained in the same manner as described in Example 7, except that an electrolyte was prepared by adding 5 parts by weight of di(trimethylopropene) tetraacrylate as a polymerizable monomer, to 100 parts by weight of an electrolyte solution, that is, a non-aqueous electrolyte solvent including ethylene carbonate (EC) and ethyl methyl carbonate (EMC) in a ratio of 1:2 (v:v) and containing 1M $LiPF_6$ dissolved therein.

COMPARATIVE EXAMPLE 3

Fabrication of a Coin-Type Secondary Battery

A coin-type secondary battery was obtained in the same manner as described in Example 7, except that an electrolyte was prepared by adding 5 parts by weight of di(trimethylopropene) tetraacrylate as a polymerizable monomer and 0.25 parts by weight of t-buthyl peroxy-2-ethylhexanoate as a polymerization initiator, to 100 parts by weight of an electrolyte solution, that is, a non-aqueous electrolyte solvent including ethylene carbonate (EC) and ethyl methyl carbonate (EMC) in a ratio of 1:2 (v:v) and containing 1M $LiPF_6$ dissolved therein.

EXPERIMENTAL EXAMPLE 3

Test on Performance of a Coin-Type Secondary Battery

Each of the secondary batteries obtained from Examples 7 to 10 and Comparative Examples 1 to 3 was charged and discharged at room temperature, and the relation between discharge capacity and discharge rate was measured. Table 2 shows the results. (charge at 0.5 C).

Table 2 shows the ratio (%) of discharge capacity with respect to 0.5 C discharge capacity. As noted in the results of Comparative Example 3, when a gel electrolyte was used, a decrease of discharge capacity by an increase of discharge rate was less than a conventional liquid electrolyte of Comparative Example 1. As noted in results of Examples 7 to 10 in which the composition of the present invention was used, the extent of gelation varied according to the amounts of initiators coated on separators, and thereby the decreased amounts of the discharge capacity was reduced.

TABLE 2

|  | Comp. Exp. 1 | Comp. Exp. 2 | Comp. Exp. 3 | Exp. 7 | Exp. 8 | Exp. 9 | Exp. 10 |
|---|---|---|---|---|---|---|---|
| 1 C discharge capacity/0.5 C discharge capacity | 97 | 61 | 95 | 92 | 97 | 96 | 95 |
| 2 C discharge capacity/0.5 C discharge capacity | 58 | 10 | 77 | 52 | 78 | 81 | 64 |
| 3 C discharge capacity/0.5 C discharge capacity | 24 | 1 | 30 | 20 | 40 | 47 | 20 |

EXAMPLE 11

Fabrication of a Secondary Battery

A separator coated with a polymerization initiator was prepared in the same manner as described in Example 1, and a gel polymer electrolyte composition was prepared in the same manner as described in Example 2.

The separator was interposed between the cathode and anode obtained from Example 7, and then the electrodes were rolled up in a jelly roll shape and were inserted into a battery case to assembly a battery. Next, into the assembled battery, the gel polymer electrolyte composition was injected to obtain a secondary battery.

EXAMPLE 12

Fabrication of a Secondary Battery

A gel polymer electrolyte composition was prepared in the same manner as described in Example 2, except that dipentaerythritol pentaacrylate was used as a polymerizable monomer, instead of trimethylolpropane triacrylate.

Also, a secondary battery was obtained in the same manner as described in Example 11, except that the gel polymer electrolyte composition obtained from the present Example 12, instead of the gel polymer electrolyte composition obtained from Example 11.

EXAMPLE 13

Fabrication of a Secondary Battery

A separator coated with a polymerization initiator was prepared in the same manner as described in Example 1, except that t-butyl peroxy-2-ethylhexanoate as a polymerization initiator was used in an amount of 0.0165 g, instead of in an amount of 0.00825 g.

Also, a gel polymer electrolyte composition was prepared in the same manner as described in Example 2, except that trimethylolpropane triacrylate was used as a polymerizable monomer in an amount of 8 parts by weight, instead of in an amount of 5 parts by weight.

A cathode and an anode were obtained in the same manner as described in Example 7.

The separator was interposed between the fabricated cathode and anode, and then the electrodes were rolled up in a jelly roll shape and were inserted into a battery case to assembly a battery. Next, into the assembled battery, the gel polymer electrolyte composition was injected, and after 3 hours, was subjected to polymerization at 80° C. for 4 hours under nitrogen atmosphere to obtain a secondary battery.

COMPARATIVE EXAMPLE 4

Fabrication of a Secondary Battery 3.30 g of a gel polymer electrolyte composition was prepared by adding 5 parts by weight of trimethylopropene tetraacrylate as a polymerizable monomer and 0.25 parts by weight of t-buthyl peroxy-2-ethylhexanoate as a polymerization initiator, to 100 parts by weight of an electrolyte solution, that is, a non-aqueous electrolyte solvent including ethylene carbonate (EC) and ethyl methyl carbonate (EMC) in a ratio of 1:2 (v:v) and containing 1M $LiPF_6$ dissolved therein.

The gel polymer electrolyte composition was impossible to inject into a battery because the composition was gelated in 1 hour at room temperature. Accordingly, it was impossible to obtain a secondary battery.

COMPARATIVE EXAMPLE 5

Fabrication of a Secondary Battery 3.30 g of an electrolyte was prepared by adding 1.5 parts by weight of vinylene carbonate and 0.5 parts by weight of 1,3-propane sultone, to 100 parts by weight of an electrolyte solution, that is, a non-aqueous electrolyte solvent including ethylene carbonate (EC), dimethyl carbonate (DMC) and diethyl carbonate (DEC) in a ratio of 4:3:3 and containing 1M $LiPF_6$ dissolved therein.

A conventional polyolefin separator, and the cathode and anode obtained from Example 7, were used to assemble a battery, and then a secondary battery was obtained by injecting the electrolyte thereto.

COMPARATIVE EXAMPLE 6

Fabrication of a Secondary Battery 3.30 g of an electrolyte solution was prepared by dissolving 1M $LiPF_6$ in a non-aqueous electrolyte solvent including ethylene carbonate (EC), propylene carbonate (PC) and diethyl carbonate (DEC) in a ratio of 3:2:5.

The electrolyte was injected to a battery assembled by using a conventional polyolefin separator and the cathode and anode obtained from Example 7 to obtain a secondary battery.

COMPARATIVE EXAMPLE 7

Fabrication of a Secondary Battery 3.30 g of a gel polymer electrolyte composition was prepared by adding 5 parts by weight of trimethylopropene tetraacrylate as a polymerizable monomer and 0.25 parts by weight of t-buthyl peroxy-2-ethylhexanoate as a polymerization initiator, to 100 parts by weight of an electrolyte solution, that is, a non-aqueous electrolyte solvent including ethylene carbonate (EC) and ethyl methyl carbonate (EMC) in a ratio of 1:2 (v:v) and containing 1M $LiPF_6$ dissolved therein.

Then, the prepared gel polymer electrolyte composition was applied to a polyolefin separator and was subjected to drying, thereby obtaining a separator.

The separator was interposed between the cathode and anode obtained from Example 7, and then the electrodes were rolled up in a jelly roll shape and were inserted into a battery case to assembly a battery. Next, into the assembled battery, an electrolyte solution in which 1M $LiPF_6$ was dissolved in a non-aqueous electrolyte solvent including ethylene carbonate (EC), and ethyl methyl carbonate (EMC) in a ratio of 1:2 (v:v) was injected to obtain a secondary battery.

COMPARATIVE EXAMPLE 8

Fabrication of a Secondary Battery 3.30 g of a gel polymer electrolyte composition was prepared by dissolving 1M $LiPF_6$ in a non-aqueous electrolyte solvent including ethylene carbonate (EC), and ethyl methyl carbonate (EMC) in a ratio of 1:2 (v:v), and adding 5 parts by weight of trimethylopropene tetraacrylate as a polymerizable monomer and 0.25 parts by weight of t-buthyl peroxy-2-ethylhexanoate as a polymerization initiator, to 100 parts by weight of the electrolyte solution.

A conventional polyolefin separator was interposed between the cathode and anode obtained from Example 7, and the electrodes were rolled up in a jelly roll shape and were inserted into a battery case to assembly a battery. Next, into the assembled battery, the gel polymer electrolyte composition was injected to obtain a secondary battery.

COMPARATIVE EXAMPLE 9

Fabrication of a Secondary Battery 0.165 g of trimethylolpropane triacrylate as a polymerizable monomer was dissolved in acetone, and then, the solution was uniformly coated on a polyolefin separator and was subjected to drying, to obtain a separator.

3.30 g of a gel polymer electrolyte composition was prepared by dissolving 1M $LiPF_6$ in a non-aqueous electrolyte solvent including ethylene carbonate (EC), and ethyl methyl carbonate (EMC) in a ratio of 1:2 (v:v), and adding 0.25 parts by weight of t-buthyl peroxy-2-ethylhexanoate as a polymerization initiator, to 100 parts by weight of the electrolyte solution.

The fabricated separator was interposed between the cathode and anode obtained from Example 7, and the electrodes were rolled up in a jelly roll shape and were inserted into a battery case. Next, the gel polymer electrolyte composition was injected to obtain a secondary battery.

EXPERIMENTAL EXAMPLE 4

Test on Performance of a Secondary Battery

Each of the secondary batteries obtained from Examples 11 to 13 and Comparative Examples 5 to 9 was charged/discharged to/from 0.2 C at room temperature, and a discharge capacity and a ratio of capacity maintenance were measured. Table 3 shows the results. In Table 3, the capacity indicates discharge capacity measured after 50 cycles, and the ratio of capacity maintenance (%) indicates the capacity measured after 50 cycles, with respect to initial discharge capacity.

TABLE 3

|  | Capacity (mAh) | Capacity maintenance ratio after 50 cycles with respect to initial capacity (%) |
|---|---|---|
| Exp. 11 | 718 | 94 |
| Exp. 12 | 726 | 92 |
| Exp. 13 | 712 | 91 |
| Comp. Exp. 5 | 708 | 88 |
| Comp. Exp. 6 | 703 | 86 |
| Comp. Exp. 7 | 670 | 72 |
| Comp. Exp. 8 | 688 | 77 |
| Comp. Exp. 9 | 663 | 63 |

As noted in Table 3, it is determined that after 50 cycles, each of the batteries obtained from Examples 11 to 13 has more improved values in a discharge capacity and a ratio of capacity maintenance, compared to each of batteries obtained from Comparative Examples 5 to 9. Especially, batteries obtained from Comparative Examples 7 to 9, each of the batteries including a gel polymer electrolyte in which a polymerization initiator and a polymerizable monomer were applied according to a different way from that of the present invention, showed significantly reduced values compared to batteries obtained from Examples 11 to 13.

Accordingly, it is determined that the secondary battery according to the present invention may include a sufficiently gelated gel polymer electrolyte, thereby improving the performance of the battery.

Industrial Applicability

In the present invention, a polymerization initiator and a polymerizable monomer are mixed with each other only after a gel polymer electrolyte composition is injected into the inside of a battery case. Accordingly, even if a polymerization initiator and a polymerizable monomer are mixed in a certain constituent ratio where injection into a battery is difficult due to gelation via a polymerization reaction at room temperature, the materials may be applied to the present invention.

Also, in the present invention, when gelation is carried out at room temperature via a polymerization reaction after the injection of a gel polymer electrolyte composition, a curing process is not required for gelation, and thus it is advantageous from an economic/time standpoint. Also, performance differences among products, which may be caused by temperature difference among batteries through the curing process, may be reduced.

Also, since a polymerization initiator and a polymerizable monomer are mixed with each other after injection, the concentration gradient between the two materials, which is caused by mixing the polymerization initiator and the polymerizable monomer with each other, is increased. Thus, gelation may be actively carried out, thereby improving the performance of a battery.

The invention claimed is:

1. A secondary battery comprising (i) a cathode; (ii) an anode; (iii) a separator; and (iv) a gel polymer electrolyte composition comprising an electrolyte solvent, an electrolyte salt, and a polymerizable monomer, wherein the gel polymer electrolyte composition does not include a polymerization initiator, and
    wherein the separator consists essentially of a porous material of polyolefin, having a polymerization initiator coating thereon, wherein the polymerization initiator coating includes a compound selected from the group consisting of benzoyl peroxide, acetyl peroxide, dilauryl peroxide, di-tert-butyl peroxide, t-butyl peroxy-2-ethyl-hexanoate, cumyl hydroperoxide, 2,2'-azobis(2-cyanobutane), 2,2'-azobis(methylbutyronitrile), 2,2'-azobis(iso-butyronitrile), 2,2'-azobisdimethyl-valeronitrile, and mixtures thereof, wherein gelation of the gel polymer electrolyte composition through a polymerization is completely carried out within a range of about 10 minutes to 4 hours.

2. The secondary battery as claimed in claim 1, wherein the polymerizable monomer is a compound having a polymerizable functional group selected from the group including a vinyl group, an epoxy group, an allyl group, and a (meth)acryl group.

3. The secondary battery as claimed in claim 1, wherein the electrolyte solvent is selected from the group including cyclic carbonates, linear carbonates, lactones, ethers, esters, sulfoxides, acetonitriles, lactams, ketones, and a halogen derivative thereof.

4. The secondary battery as claimed in claim 1, wherein the electrolyte salt comprises a combination of (i) a cation selected from the group including $Li^+$, $Na^+$, and $K^+$ and (ii) an anion selected from the group including $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$.

5. The secondary battery as claimed in claim 1, wherein the polymerizable monomer is included in an amount of 0.01 to 10 parts by weight, based on 100 parts by weight of a mixture of the electrolyte solvent and the electrolyte salt.

6. The secondary battery as claimed in claim 1, wherein the polymerization initiator is included in an amount of 0.01 to 5 parts by weight, based on 100 parts by weight of a mixture of the electrolyte solvent and the electrolyte salt.

7. The secondary battery of claim 1, wherein the gelation is completely carried out within a range of about 10 minutes to 3 hours.

8. The secondary battery of claim 1, wherein the gelation is completely carried out within a range of about 10 minutes to 90 minutes.

9. The secondary battery of claim 1, wherein the gelation is completely carried out within a range of about 10 minutes to 60 minutes.

10. A method for manufacturing a secondary battery comprising a cathode, an anode, a separator, and a gel polymer electrolyte, the method comprising the steps of:
    coating or adding a polymerization initiator on/to the separator in contact with the gel polymer electrolyte, wherein the polymerization initiator is a compound selected from the group consisting of benzoyl peroxide, acetyl peroxide, dilauryl peroxide, di-tert-butyl peroxide, t-Butyl peroxy-2-ethylhexanoate, cumyl hydroperoxide, 2,2'-azobis(2-cyanobutane), 2,2'-azobis(methylbutyronitrile), 2,2'-azobis(iso-butyronitrile), 2,2'-azobisdimethyl-valeronitrile, and mixtures thereof;
    inserting the cathode, the anode, and the separator into a battery case; and
    forming the gel polymer electrolyte by injecting a gel polymer electrolyte composition comprising an electrolyte solvent, an electrolyte salt, and a polymerizable monomer into the battery case, wherein the gel polymer electrolyte composition does not include a polymerization initiator and
    carrying out polymerization so that gelation of the gel polymer electrolyte composition is completely carried out within a range of about 10 minutes to 4 hours.

11. The method as claimed in claim 10, wherein the polymerizable monomer is a compound having a polymerizable functional group selected from the group including a vinyl group, an epoxy group, an allyl group, and a (meth)acryl group.

12. The method as claimed in claim 10, wherein the polymerizable monomer is included in an amount of 0.01 to 10 parts by weight, based on 100 parts by weight of a mixture of the electrolyte solvent and the electrolyte salt.

13. The method as claimed in claim 10, wherein the polymerization initiator is included in an amount of 0.01 to 5 parts by weight, based on 100 parts by weight of a mixture of the electrolyte solvent and the electrolyte salt.

14. The method of claim 10, wherein the gelation is completely carried out within a range of about 10 minutes to 3 hours.

15. The method of claim 10, wherein the gelation is completely carried out within a range of about 10 minutes to 90 minutes.

16. The method of claim 10, wherein the gelation is completely carried out within a range of about 10 minutes to 60 minutes.

* * * * *